United States Patent [19]

Luft

[11] 4,409,069

[45] Oct. 11, 1983

[54] METHOD OF DETERMINING SULFUR DIOXIDE IN GASES AND APPARATUS THEREFOR

[75] Inventor: Harald Luft, Niederzier, Fed. Rep. of Germany

[73] Assignee: Kernforschungsanlange Jülich GmbH, Fed. Rep. of Germany

[21] Appl. No.: 351,411

[22] Filed: Feb. 23, 1982

[30] Foreign Application Priority Data

Mar. 9, 1981 [DE] Fed. Rep. of Germany ..... 31088809

[51] Int. Cl.$^3$ ........................................... G01N 27/50
[52] U.S. Cl. ................................... 204/1 T; 204/401; 204/409; 204/411; 204/412; 204/431; 436/122
[58] Field of Search ................... 204/195 R, 1 F, 409, 204/431, 401, 412, 411; 422/98; 436/122, 149

[56] References Cited

U.S. PATENT DOCUMENTS 3,912,613 10/1975 Heuser ........................... 204/195 R

OTHER PUBLICATIONS

Victor H. Regener, "Automatic Ozone Recorder, Small Model," The Univ. New Mexico, (1956).

*Primary Examiner*—G. L. Kaplan
*Attorney, Agent, or Firm*—Omri M. Behr

[57] ABSTRACT

A method and apparatus are disclosed for determining sulfur dioxide content in a gas sample. The apparatus is a polarographic- type one having first and second tubular chambers. The first chamber has a gas inlet. Gas coming therein causes an electrolyte to circulate around the two chambers with the second chamber having a sensing electrode and a counter electrode therein.

10 Claims, 5 Drawing Figures

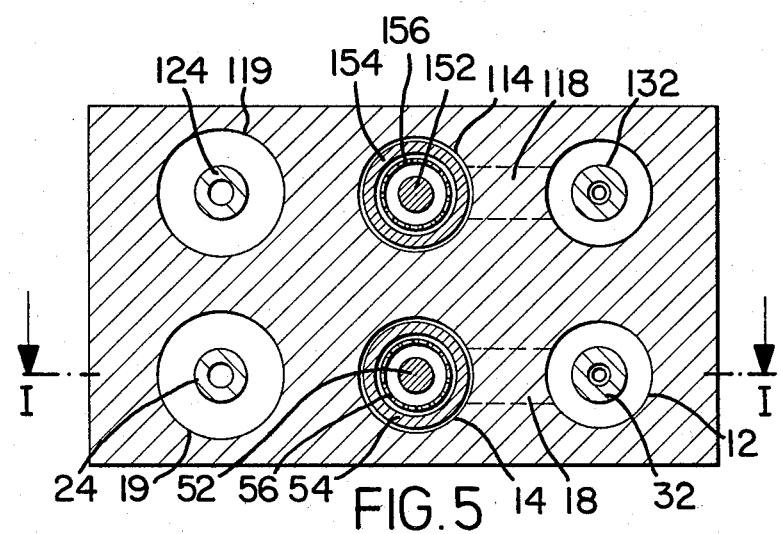

METHOD OF DETERMINING SULFUR DIOXIDE IN GASES AND APPARATUS THEREFOR

BACKGROUND OF THE INVENTION

The determination of trace components of gases and especially of the SO₂ content in exhaust gases has become one of the most important questions of measuring technique of the present time.

All of the presently known measuring apparatus which operate on various principles (for example infrared, thermal conductivity, UV etc.,) are either too expensive or can only be utilized within rather narrow ranges.

It is possible to show by comparative experiments that a measuring device based upon electrochemical principles can not only be constructed very economically but is also utilizable over rather wide concentration ranges.

Furthermore by appropriate selection of the working potential it is possible to contemporaneously measure a variety of oxidisable or reducible materials, which is a further advantage.

An electrochemical measuring cell for SO₂ has been constructed heretofore (Chemie.-Ing Technik 49, 398 (1977)). This cell was conceived as a modification of a conventional fuel cell, that is to say, it operates with porous electrodes. This fact gives rise to a non negligible complication. Since the measuring, as well as the counter electrodes have approximately similar polarization qualities, such a cell must be operated with a potentiostat and a 3 electrode system (i.e. measuring-counter- and reference electrode). This is a further complication which must of course lead to an increase in cost of the device. The rapidity of the signal change, with respect to a concentration of sulfur dioxide which alters over a given time period, is not known. It must be presumed, however, that there would be a fairly substantial time delay since the diffusion of the gas must clearly be somewhat delayed by the inert Teflon underlayer.

A further method of measuring sulfur dioxide concentration by electrochemical means is disclosed by J. V. A. Novak (Collection Czech Chem. Commun. 25, 3099 1960).

This method is based on the concept of the change of the diffusion restricted polarographic step of sulfide dioxide dissolved in an electrolyte. A carbon rod is utilized as the indication electrode. As the unpolarizable counter electrode there is utilized metallic copper in a solution of cupric ions (copper sulfate). This analyzer is very steady, simple in concept substantially disturbance free in practice, and also fairly inexpensive.

There are, however, problems inherent in the construction of a such a device. The gas is fed sidewards to a measuring electrode having an angled surface cut therein. This construction, because of unsatisfactory electrolyte flow, leads to an unfortunate sluggishness in the system. When the concentration of the sulfur dioxide alters suddenly, the corresponding signal change is only noted with a considerable time delay (See FIG. 2. Curve A shows actual SO₂ concentration change and Curve B the signal from a device constructed in accordance with the Novak disclosure.)

The surface of the electrode directly available to the gas stream is so small that the measured current which is the indicator of the sulfur dioxide concentration is also relatively small. Thus, clearly the obtainable measuring sensitivity is also not great (See FIG. 3, curve A).

If one increases the electrode surface (i.e. by using a thicker rod) in order to avoid this disadvantage, the measuring signal is increased, however, the electrode surface directly available to the gas stream still remains relatively small and the already unsatisfactory signal delay is thus made worse.

SUMMARY OF THE INVENTION

It is our finding that the disadvantages of the prior art devices can be overcome by a relatively simple structural change in which this polarographic analyzing device is constructed in the form of a air lift pump.

Thus a gas analyzing device of the present invention can be characterized thereby that gas is led into the electrolyte causing circulation to occur based upon the principle of a lifting pump which causes gas saturated electrolyte to flow between the space between the measuring and the counter electrode. In such an arrangement the gas to be examined is mixed intimately with the electrolyte in the measuring cell which is circulated by the rising gas stream. In one particularly desirable embodiment of the device the arrangement is duplicated whereby there is provided one cell as a reference cell and the other as a measuring cell and the limiting current is given as the difference of the currents produced by both streams.

BRIEF DESCRIPTION OF THE DRAWINGS

FIG. 5 shows a plan cross sectional view of a double cell of the type of FIG. 1 viewed at 5—5.

DETAILED DESCRIPTION OF THE DRAWINGS

Figure 1:
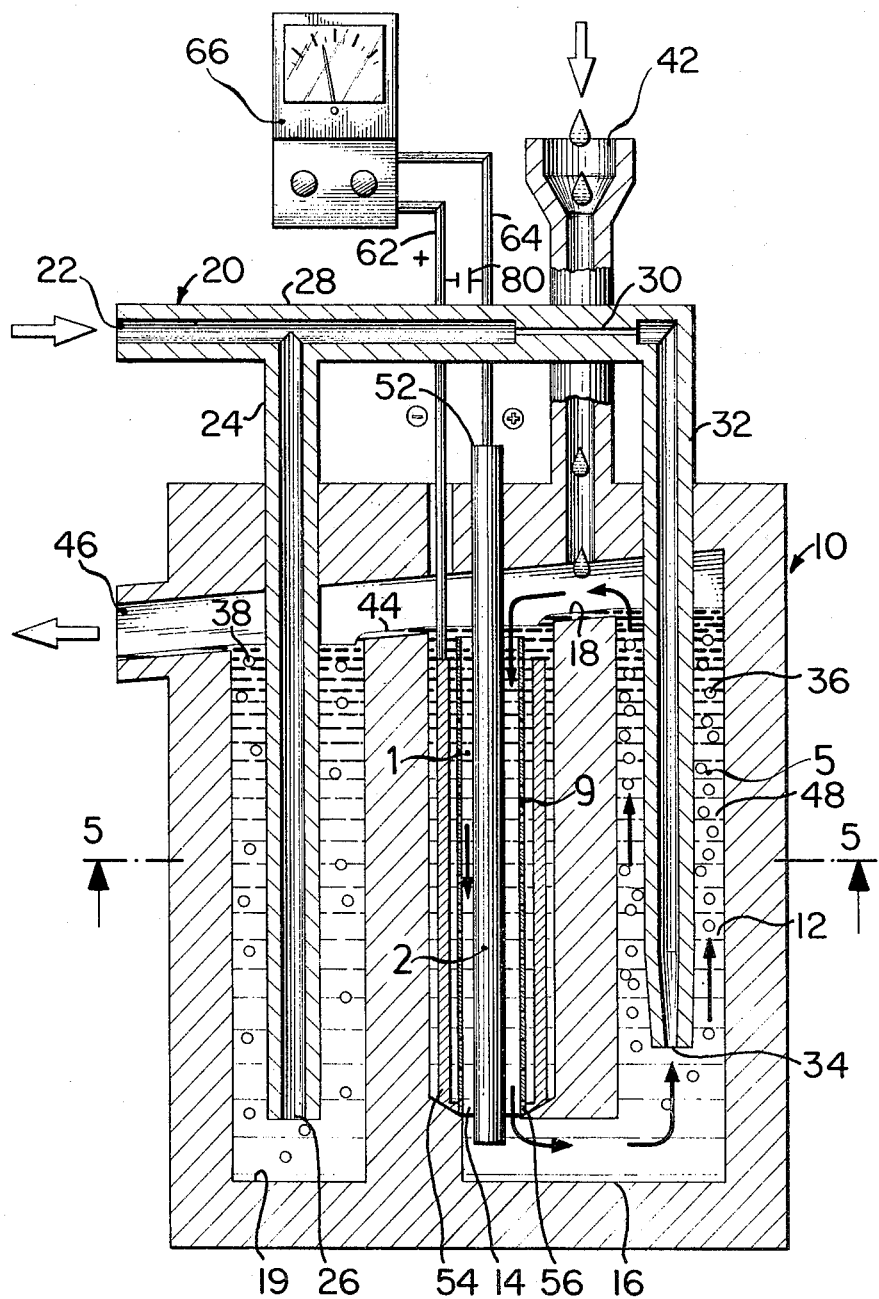
FIG. 1 shows a schematic elevational cross sectional view of a particular embodiment of a gas analyzer for the determination of SO₂ content of the exhaust gases.

A preferred embodiment of the present invention is illustrated in FIG. 1. The apparatus comprises a housing 10 containing a first chamber 12 and a second chamber 14. The second chamber is connected to the first chamber by lower connecting passage 16. The top of chamber 12 is constructed to be somewhat higher than the top of chamber 14 so that if an excess amount of electrolyte 48 is placed in first chamber 12 this will flow into second chamber 14 via passage 18. A gas inlet tube 32 is provided to chamber 12 in such a manner that lower outlet 34 thereof is located in the lower portion of chamber 12. A measuring electrode 52 in the form of a rod is placed substantially axially in second chamber 14 and is surrounded by coaxial cylindrical counter electrode 54. Lead 62 connects the counter electrode to the negative pole of a source of direct current i.e. battery 80 and lead 64 connects the positive pole thereof to the measuring electrode 52. Similarly leads 62 and 64 are connected to a current measuring means suitably an ammeter 66. Fresh electrolyte 48 is added dropwise through electrolyte inlet 42.

In the operation of the device, electrolyte 48 is filled into chambers 12 and 14 and fresh electrolyte 48 added dropwise through electrolyte inlet 42. A potential is applied between measuring electrode 52 and counter electrode 54 and gas, suitably containing a gas such as sulfur dioxide is passed into inlet tube 32 and gas bubbles 36 pass out of the gas inlet tube outlet 34. The upwardly moving action of these bubbles cause gas saturated electrolyte pass first upper connecting passage 18 into the top of chamber 14 causing a continual circulation in the direction in the arrows in the drawing. The current which thus passes between the measuring electrode and the counter electrode is indicated current measuring means 66.

In order to achieve maximum efficiency of this device certain modifications are desirable. It is desirable to control the pressure of the gas in chamber 12 to a known level. This is done by providing to the cell a thid chamber 19 filled with electrolyte 48 into which electrolyte flows from chamber 14 via second upper connecting passage 44 and flows out through electrolyte outflow tube 24. A manostat tube 24 which is connected to gas inflow 20 is inserted into chamber 19 to the desired depth in order to predetermine the pressure of operation. Inflow tube 20 is connected to gas inlet tube 32 via connector line 28. It has been found especially desirable to interpose between line 28 and tube 32 a capilliary tube 30.

Where the gas to be measured is sulfur dioxide in exhaust gases, it has been found suitable to utilize a carbon rod as measuring electrode 52 together with a copper tube counter electrode 54.

In the operation of this device the use of aq. sulfuric acid or aqueous sulfuric acid/aqueous copper sulfate as electrolyte has been found advantageous. There may be utilized copper sulfate of between about 0.02 and about 0.2 M, and sulfuric acid of between about 0.01 and about 0.1 M suitably about 0.05 M. It has been found suitable to utilize carbon rods having a diameter of about 2 to about 5 millimeters suitably about 3 millimeters having a length dependent upon the size of the cell but generally lying in the area of about 50 millimeters.

As counter electrodes there may be utilized cylindrical electrodes of different compositions. There may be utilized a cylindrical platinum net having a diameter of approximately 8 millimeters, graphite cylinder, tungsten carbide cylinder or a copper tubing having a similar diameter. In a further embodiment of the invention it is desirable to interpose an electrolytically permeable barrier such as a cylindrical sinter 56 (shown in FIG. 1 in Phantom) between the measuring electrode and the counter electrode. The composition of this sinter is not critical, provided it is stable under the cell conditions. The internal diameter of the counter electrode is in this case slightly greater, e.g. 15 millimeters. As the electrolyte circulates between the sinter 56 and the anode 52 its velocity cannot be influenced by the volume changes of the cathode 54 behind the sinter 56 and consequently the magnitude of the electric current is not influenced as well. The gas is introduced at a velocity of between 0.5 and 1.5 liters per minute suitably about 0.5 liters per minute and, in the normal exhaust gases to be studied may have a sulfur dioxide content of the order of 2,000 ppm. This ordder of magnitude will give rise to a current of the order of 4 mA during the operation of the device.

As will be understood by those skilled in the art, this level of current is not negligible and will cause a build up of metallic copper upon the counter electrode. Giving consideration to the dimensions set further hereinabove, as preferred dimensions the counter electrode has an initial separation from the measuring electrode of approximately 2.5 millimeters. A reduction of this separation by deposited copper down to 2 millimeters is permissable since the signal intensity is not influenced thereby. Theoretically at the 4 mA current level this would be equivalent to a time interval of 46 days. Under normal circumstances, however, the exhaust gases comprise a certain amount of air which itself contains approximately 10% of oxygen. The presence of this oxygen serves to re-oxideize the deposited copper so that the actual deposit rate is only about 70% of the theoretical rate, thus, the separation of 2 millimeters is reached only after about 65 days. Where lower sulfur dioxide content is to be considered, this time interval is of course greater. Thus, it is entirely acceptable to replace the copper tube with a new one once a month or two months which is an entirely acceptable mode of processing.

The reduction of cross section may be also be eliminated by certain alterations in the structure.

In modification, the cell is constructed in the form of a twin cell, for example, by a doubling of the arrangement in accordance with FIG. 5 wherein, for example, while one half is in operation ordinary air is passed through the second half in which the copper is not electrically charged and is in the mean time oxidized back by air oxidation. Where levels of $SO_2$ content are low, this reoxidation will occur simply by omission of application of electrical potential while the exhaust gas is passed through said second cell.

In another modification the electrolyte runs between the measuring electrode and the sinter 56 at a constant separation. The copper is deposited behind the sinter. The internal diameter of the counter electrode can, in this case, be chosen to be so great (for example 15 millimters) that it is only necessary to change the electrode once a year.

In all embodiments in order to affect a change of counter electrode, the head of the housing block is provided with an appropriate screw thread means interactable with a similar screw thread on the body of the counter electrode itself.

In the operation of the device it is desirable to provide for a temperature stabilization of the measured current.

The intensity of the polarographic current, which, at a given potential, flows through the cell is taken as a measure of the concentration of sulfur dioxide. This current is generated the depolarization effect at the anode and is produced by two separate components:

(a) the kinetically caused ground current which is very temperature unstable and (b) the diffusion caused measuring current which is proportional to the sulfur dioxide concentration.

An electrochemical diffusion current becomes progressively greater with increase in temperature. On the other hand, this current increase is compensated by the reduced solubility of sulphur dioxide with increasing temperature so that this portion of the current is substantially unaffected by temperature changes.

Where the entire current is only measured in one cell the temperature influences change the kinetic component and thus inconsequence thereof the entire current. In order to avoid this effect two cells are again utilized. In the first (the reference cell) only air or exhaust gas free of S02 (for example by appropriate filtration) is fed to the measuring electrode so that this cell only measures the kinetic ground current. In the second (measuring cell) the gas to be examined, which contains the sulfide dioxide, is introduced. A current comprising both components thus flows through this cell. Thus, if the difference between the currents in these two cells is then measured there is obtained a measuring signal which reflects only the pure diffusion component which is proportional to the sulfur dioxide content and thus remains temperature stable.

This entire arrangement is shown in FIG. 1 and FIG. 5.

Figure 4:
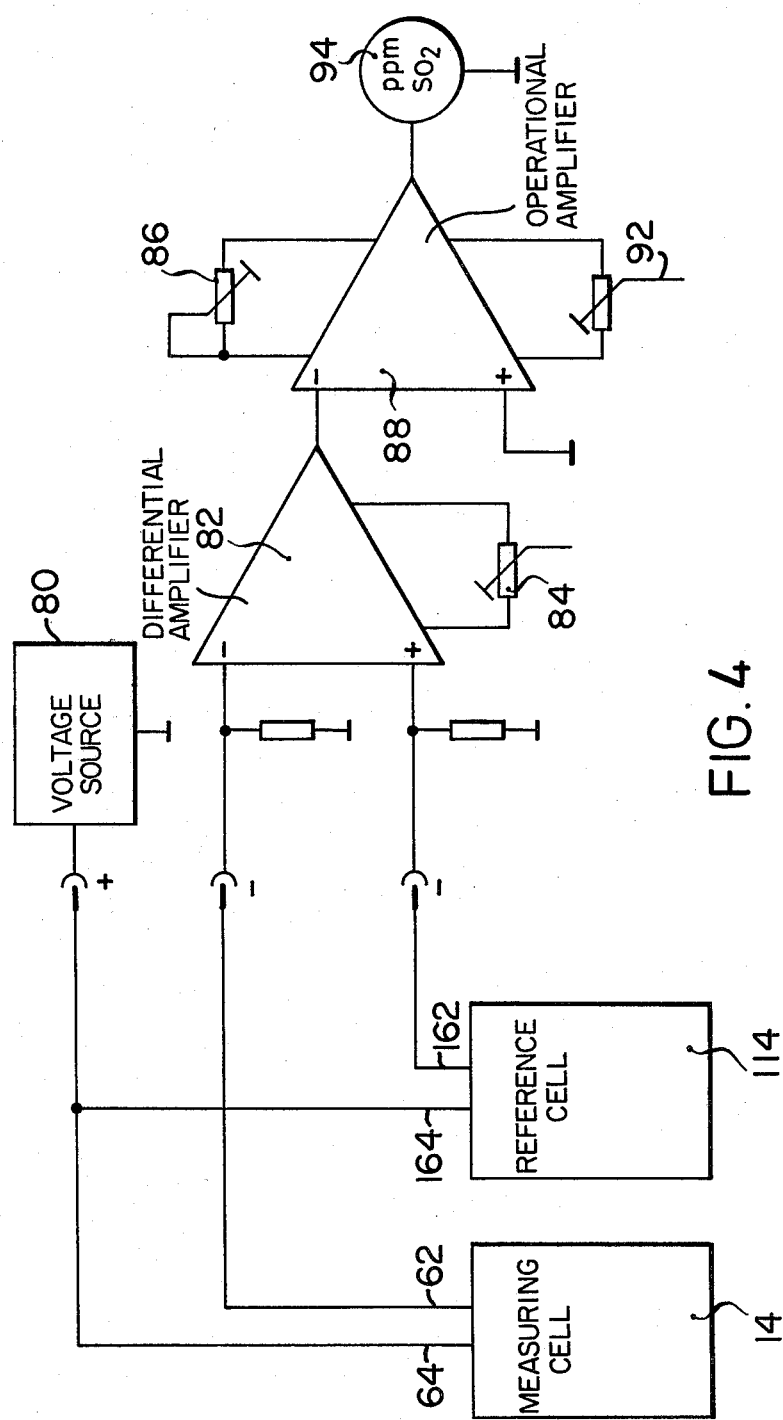
FIG. 4 shows a schematic diagram for the measurement of differences in current.

FIG. 4 shows an schematic electrical arrangement appropriate for such comparitive measurement.

Both cells 14 and 114 are shown schematically. (In the drawings, the "one hundred" digit signifies another one of the same component bearing the same last two digits i.e. 114 is the same type of component as 14). The structure of the cells is as will be found in FIG. 1. Both graphite electrodes 52 and 152 are connected to the same potential source 80. The measuring and reference currents are then compared by an operational amplifier 82 connected as a differential amplifier and the thus produced difference appropriately amplified. The subsequently positioned operational amplifier 88 amplifies the signal to the level necessary for indication in the indication measuring means 94.

A potentiometer 84 is utilized to bring both cells to a null point indication under the provision of equivalent gases in particular $SO_2$-free gas. Thereafter a gas mixture containing predetermined concentrations of, say, sulfur dioxide is led into the measuring cell 14 and the indicator on the measuring arrangement 94 is calibrated by means of potentiometer 86 to correspond with a known sulfur dioxide concentration of the controlled gas mixture.

In the actual process of measurement the gas to be examined is led to the measuring cell under the same conditions and its $SO_2$ content is determined relative to the reference cell.

Figure 2:
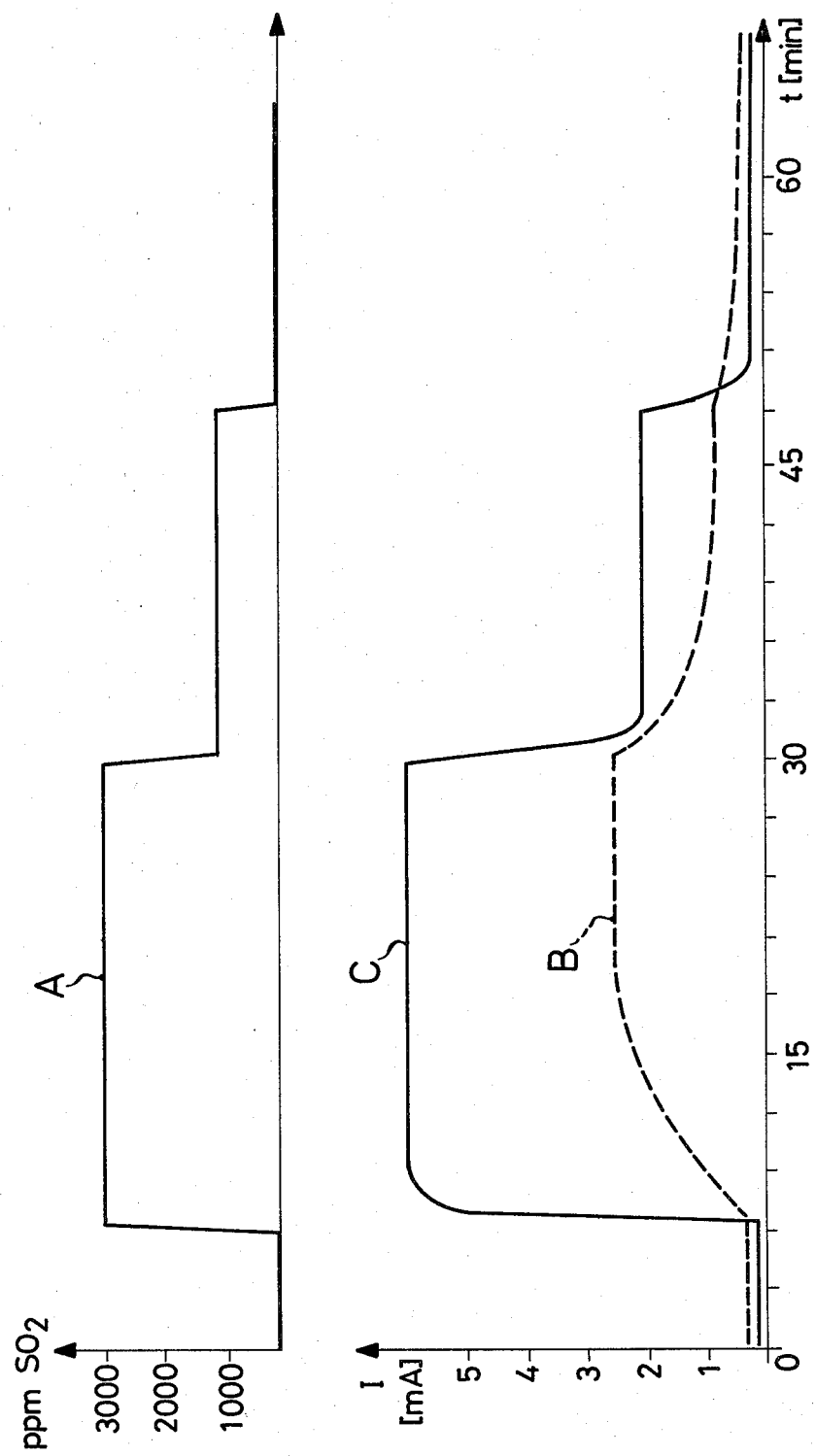
FIG. 2 shows a curve for the response of an analyzer of the present invention in comparison to that shown by a known analyzer.

Utilizing an apparatus as described above it is possible to obtain measuring curves such as those shown in curve C of FIG. 2 which show a very prompt and sensitive response of the actual sulfur dioxide concentration (represented by curve A in FIG. 2).

Figure 3:
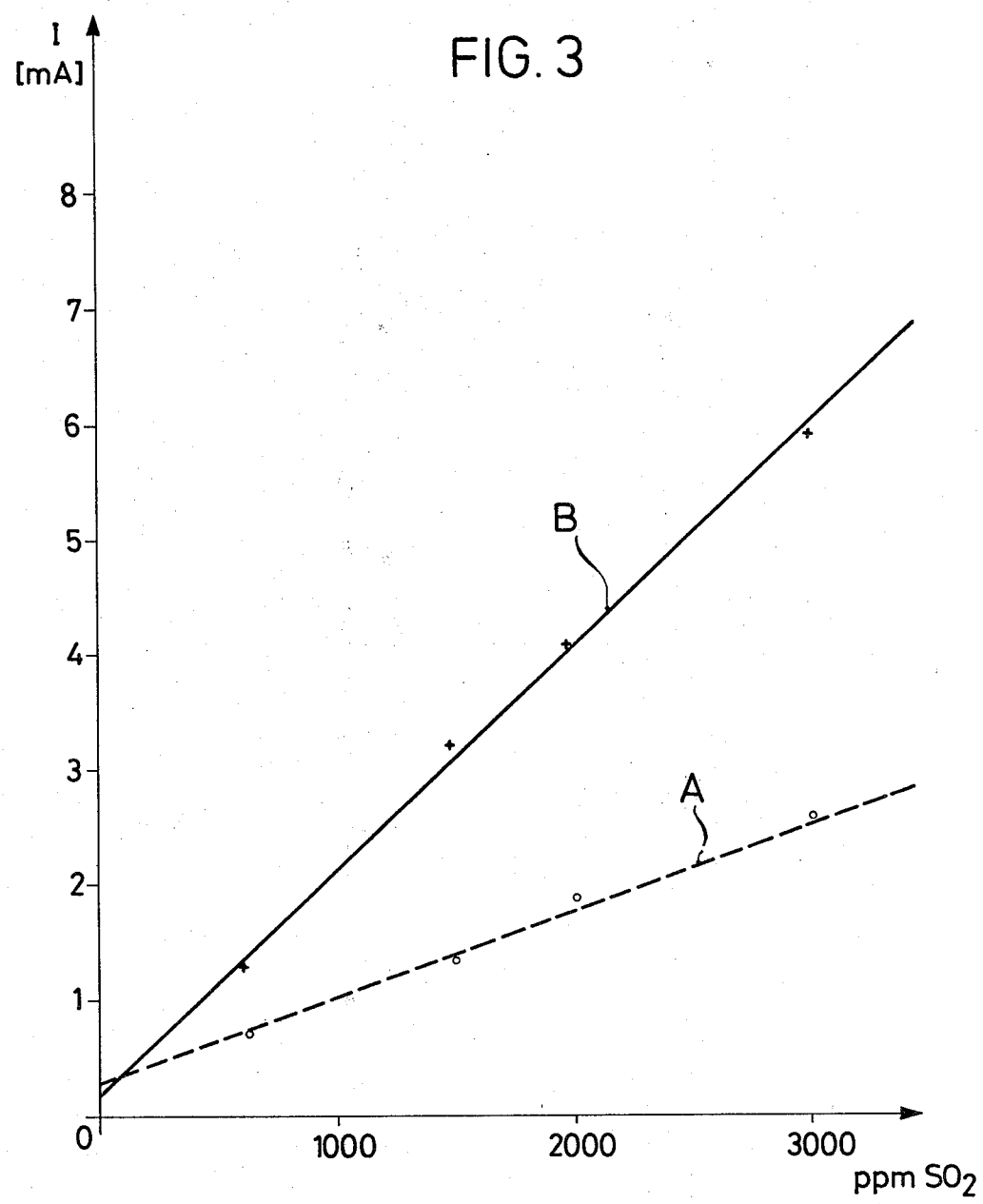
FIG. 3 shows the curves for the sensitivity of a device of the present invention in comparison to that of the known apparatus.

FIG. 3 demonstrates in curve B a measuring sensitivity of an analyzer of the present invention with respect to sulfur dioxide concentration in comparison to a known analyzer demonstrated by curve A. In accordance with the foregoing principals several different analyzers have been constructed.

EXAMPLE 1

The measuring electrode is constructed of a 50 millimeter carbon rod (diameter 3 millimeters) the reference electrode is provided in the form of a cylindrical platinum net (8.0 millimeter cross section). As electrolyte there is provided 0.1 sulfuric acid into which the gas to be measured is introduced at a velocity of 0.5 and 1.5 liters per minute suitably about 0.5 liters per minute in accordance with the actual form of construction of the apparatus.

The carbon electrode is positively charged ($U=1.4$ V) and thus causes oxidation of the sulfur dioxide to sulfuric acid, at the cathode, hydrogen is produced. Initially, however, the sulfur dioxide is cathodically reduced to elemental sulfur which brings about a minor coloration of the cathode. No change in the efficiency of the analytical device has been noted by this effect.

By the addition of iodine in catalytic amounts either in the form of iodine itself or as iodine ion, the sensitivity of the device may be increased by a further ca. 50%.

EXAMPLE 2

The measuring electrode is formed from a 50 millimeter carbon rod (diameter 3 millimeters) the reference electrode is formed from a cyclindrical piece of copper tubing (diameter 8 millimeters). The electrolyte utilized was 0.02 M copper sulfate/0.05 M sulfuric acid which was continuously renewed. (Alternatively there may be utilized 0.2 M copper sulfate with 0.05 M sulfuric acid which is circulated outside the cell and treated with activated charcoal to remove sulfur dioxide therefrom). The carbon electrode is positively charged ($U=1.1$ V) (oxidation of $SO_2$ to $H_2S_4O$) and metallic copper is deposited upon the cathode.

We claim:

1. An apparatus for polarographic analysis of sulfur dioxide in gases by measurement of the anodic oxidation current due to said sulfur dioxide comprising:
   (a) a housing having a first and a second tubular chamber and upper and lower connecting means for interconnecting said chambers at their upper and lower portions respectively,
   (b) a measuring electrode within said second chamber,
   (c) a non-polarizable copper counter electrode within said second chamber spaced apart from said measuring electrode so as to permit electrolyte to be placed therebetween;
   (d) a gas inlet tube within said first chamber having an opening proximate to the bottom part of said chamber for the introduction of gas to be analyzed into said chamber when said housing is filled with electrolyte, the difference of the density of the undissolved gas containing electrolyte in said first chamber and the density of the electrolyte in said second chamber capable of creating a circulation of gas saturated electrolyte in the housing when said housing is charged with electrolyte;
   (e) means for connecting a source of electrical potential across said electrodes,
   (f) means for measuring the current flowing between said electrodes when the device is charged with electrolyte, gas passed thereinto and potential applied across the electrodes, and
   (g) inflow and outflow means for the continued supply of fresh electrolyte to said chambers.

2. An apparatus in accordance with claim 1 wherein said upper connecting means is so constructed that liquid flowing therein passes only from said first chamber into said second chamber further comprising a second upper liquid connecting means attached to the upper end of said second chamber.

3. An apparatus in accordance with claim 2 wherein the measuring electrode is a carbon electrode, and further comprising an electrolyte of aqueous copper sulfate or aqueous copper sulfate in the presence of aqueous sulfuric acid.

4. Apparatus in accordance with claim 1 comprising a carbon measuring electrode.

5. An apparatus in accordance with claim 4 further comprising an electrolyte of aqueous copper sulfate together with aqueous sulfuric acid.

6. A composite apparatus comprising a pair of substantially identical apparatus of claim 1 wherein the gas inflow to one of said apparatus is connectable to a different gas source from that for the other apparatus.

7. A composite apparatus according to claim 6 additionally comprising means for comparing the current flow in one apparatus to that in the other apparatus.

8. An apparatus in accordance with claim 7 comprising:
   (a) a source of positive potential applicable to the measuring electrodes,
   (b) an operational amplifier connected as a differential amplifier, the input thereof being connected to the output of said counter electrodes,
   (c) means for providing a null setting to said differential amplifier,
   (d) operational amplifier connected to the output of said differential amplifier, and
   (e) output measuring means connected to the output of said operational amplifier.

9. Process of measuring the limiting current of sulfur dioxide in an apparatus of claim 8 comprising the steps of:
   (a) providing measuring electrodes in the form of carbon rods,
   (b) providing counter electrodes in the form of copper tubes,
   (c) charging the chambers with an electrolyte comprising an aqueous solution of copper sulfate and sulfuric acid,
   (d) providing a slow continuous flow of electrolyte to the chambers,
   (e) providing a positive potential source thereto the carbon rod measuring electrodes,
   (f) providing a stream of sulfur dioxide free air to both cells,
   (g) adjusting the measuring means to show null sulfur dioxide content,
   (h) providing an air steam free of sulfur dioxide to one cell and a stream containing predetermined concentrations of sulfur dioxide to the other cell,
   (i) calibrating the measuring means to reflect the provided predetermined concentration of sulfur dioxide,
   (j) repeating the step of (h) above using unknown, in place of predetermined, concentrations of sulfur dioxide, and
   (k) measuring the unknown concentration of sulfur dioxide.

10. Process for measuring the limiting current of sulfur dioxide in a gas containing sulfur dioxide utilizing the apparatus of claim 1 comprising the steps of:
   (a) charging a suitable electrolyte to the chambers,
   (b) passing the gas to be analyzed into the electrolyte through the gas inlet tube,
   (c) measuring the current generated in the cell.

* * * * *

UNITED STATES PATENT AND TRADEMARK OFFICE
CERTIFICATE OF CORRECTION

PATENT NO. : 4,409,069

DATED : October 11, 1983

INVENTOR(S) : Harald Luft et al.

It is certified that error appears in the above-identified patent and that said Letters Patent is hereby corrected as shown below:

On the title page, add Item /75/:

Jiri Divisek, Julich, Fed Rep Germany and Leander Furst,

Julich, Fed Rep Germany --.

Signed and Sealed this

Eleventh Day of June 1985

[SEAL]

Attest:

DONALD J. QUIGG

Attesting Officer  Acting Commissioner of Patents and Trademarks